(No Model.)

A. W. THOMAS.
VEHICLE WHEEL TIRE.

No. 399,354. Patented Mar. 12, 1889.

WITNESSES:
R. B. Shepherd.
Hermann Bormann.

INVENTOR.
Amos W. Thomas.
By J. Walter Douglass.
Atty.

UNITED STATES PATENT OFFICE.

AMOS W. THOMAS, OF PHILADELPHIA, PENNSYLVANIA.

VEHICLE-WHEEL TIRE.

SPECIFICATION forming part of Letters Patent No. 399,354, dated March 12, 1889.

Application filed June 30, 1888. Serial No. 278,639. (No model.)

*To all whom it may concern:*

Be it known that I, AMOS W. THOMAS, a citizen of the United States, residing at the city of Philadelphia, in the county of Philadelphia and State of Pennsylvania, have invented certain new and useful Improvements in Tires for the Wheels of Vehicles, of which the following is a specification.

My invention relates to tires composed of elastic or compressible material constructed in a tubular or other form and capable of being inflated by the introduction of air, gas, water, or other fluid into them.

My invention in general is applicable to the road-wheels of carriages or other rolling conveyances, but more particularly to the road-wheels of bicycles, tricycles, and velocipedes of all varieties.

The principal object of my invention is to render more durable and serviceable the tires of the road-wheels of such rolling conveyances.

My invention consists of a tubular or other form of tire composed of elastic or compressible material, having the portion thereof constituting the tread re-enforced or strengthened to a greater degree than the portion caused to engage with the felly-facing portion of the wheel. The construction of such a tire may be effected in more than one way. In the accompanying drawings I have illustrated three constructions alike embodying the characteristic features of my invention, but from the standpoint of construction or formation different, and in which—

Figure 1:
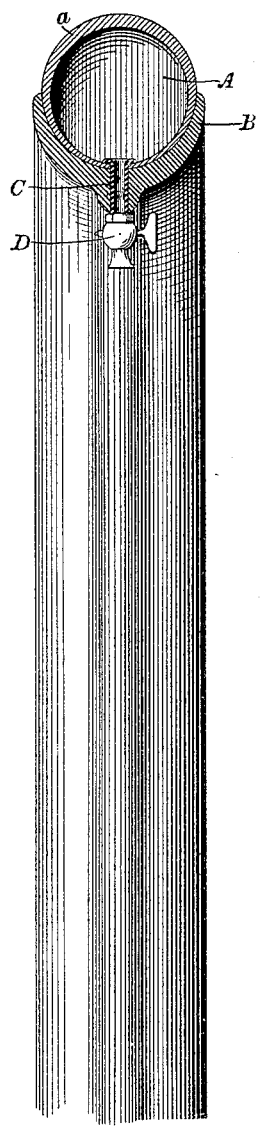
Figure 2:
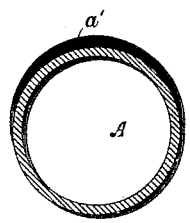
Figure 3:
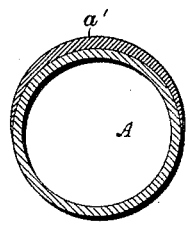

Figure 1 is a transverse section of a tire embodying my invention as applied to a groove-faced metal felly of the character employed in bicycles, a portion of said felly being shown partly in section and partly in elevation; and Figs. 2 and 3 are transverse sections of tires embodying the invention but different respectively in construction from each other and that of the tire in Fig. 1.

Referring to the drawings, A is the tire formed of a continuous tube of rubber or other suitable material.

In the tire of Fig. 1 *a* represents the tread portion of the tire, which is made thicker than the felly-facing portion—that is, the tire made of the same material throughout is thickened at the tread portion to approximately double that of the felly-facing portion. This formation of the two portions of the tire may be accomplished in any preferred manner in the construction of the tube or tire itself. The tire as a whole is primarily secured to the felly B by being sprung into the peripheral concave groove of the outer face of the felly, and may be ultimately secured to place therein by cement or other glutinous or adhesive substance or material.

The thickening of the tread portion of the tires (illustrated in Figs. 2 and 3) is effected by strengthening the same by an applied re-enforce, which, in Fig. 2, is composed of a very tough and durable material, $a'$, or one in a less degree subject to abrasion or wear than the material of which the body A of the tire is mainly composed, while that in Fig. 3 is composed of the same material, $a'$, as that of which the body of the tire itself is composed, but applied separately thereto after the body of the tire has been formed from a tube having the wall of uniform thickness throughout. Both of the above-described re-enforces may be secured to the body of the tire by cement or other suitable fastening contrivances. The tire may be made with the entire depth of surface of the tread portion thereof of a tougher material than the felly-facing portion, as shown in Fig. 1, or only the outer surface thereof, or the re-enforce separately applied to the tread portion of the tire may be made wholly or in part of a tougher material than the tube itself, as shown in Figs. 2 and 3, by mixing or combining with the mass or material of which the tube or re-enforce is composed sand or fibrous materials which will give the desired toughness thereto. If the tube is made of rubber, sand or other substance or material may be mixed or combined therewith in variable proportions and the mixture or mass subsequently subjected to vulcanization to bring the same to its perfected state or condition for use.

The tire after being secured to place in the groove of the felly may be inflated by introducing a tube, C, provided with a cock, D, through the same into the hollow tire A, and air, gas, water, or other liquid or fluid forced through the tube into the interior of the tire.

The tire, of course, must as a whole be made fluid-tight, in order that after inflation it may normally maintain its cylindriform contour for an indefinite period. The degree of compressibility may be regulated by the amount of inflation or by the tension of the inflating medium, which may be introduced under pressure.

Various materials may be employed for the formation of the tube—such, for instance, as leather or woven or textile fabric suitably filled or treated to render it impervious to liquids or fluids; but I give preference to the use of rubber for the purpose.

The particular advantage incident to the use of such a tire, in addition to being exceptionably strong, tough, and durable, is that it is capable of admirably withstanding friction, abrasion, and rough usage of wear to which, of course, such tires are subject, especially in their application to the road-wheels of bicycles, tricycles, velocipedes, and other rolling conveyances.

Having thus described the nature and objects of my invention, what I claim as new, and desire to secure by Letters Patent, is—

1. A tire having the tread portion made thicker than the felly-facing portion, in combination with a felly and means, substantially as described, for permitting of the inflation of the tire, substantially as and for the purposes set forth.

2. A hollow tire having a re-enforce applied to the tread portion, in combination with a felly and a cock secured into said felly and tire, substantially as and for the purposes set forth.

In witness whereof I have hereunto set my signature in the presence of two subscribing witnesses.

AMOS W. THOMAS.

Witnesses:
W. A. WHITMORE,
GEO. W. REED.